TRAFFIC MONITORING CIRCUIT

Filed Jan. 11, 1960 2 Sheets-Sheet 1

INVENTORS W. J. LAMNECK
W. T. WICHMAN
BY [signature]
ATTORNEY

TRAFFIC MONITORING CIRCUIT

Filed Jan. 11, 1960 2 Sheets-Sheet 2

INVENTORS W. J. LAMNECK
W. T. WICHMAN
BY [signature]
ATTORNEY

United States Patent Office 3,115,549
Patented Dec. 24, 1963

3,115,549
TRAFFIC MONITORING CIRCUIT

William J. Lamneck, Jamaica, N.Y., and Wesley T. Wichman, Mountain Lakes, N.J., assignors to Bell Telephone Laboratories, Incorporated, New York, N.Y., a corporation of New York Filed Jan. 11, 1960, Ser. No. 1,604
25 Claims. (Cl. 179—8)

Figure 1:
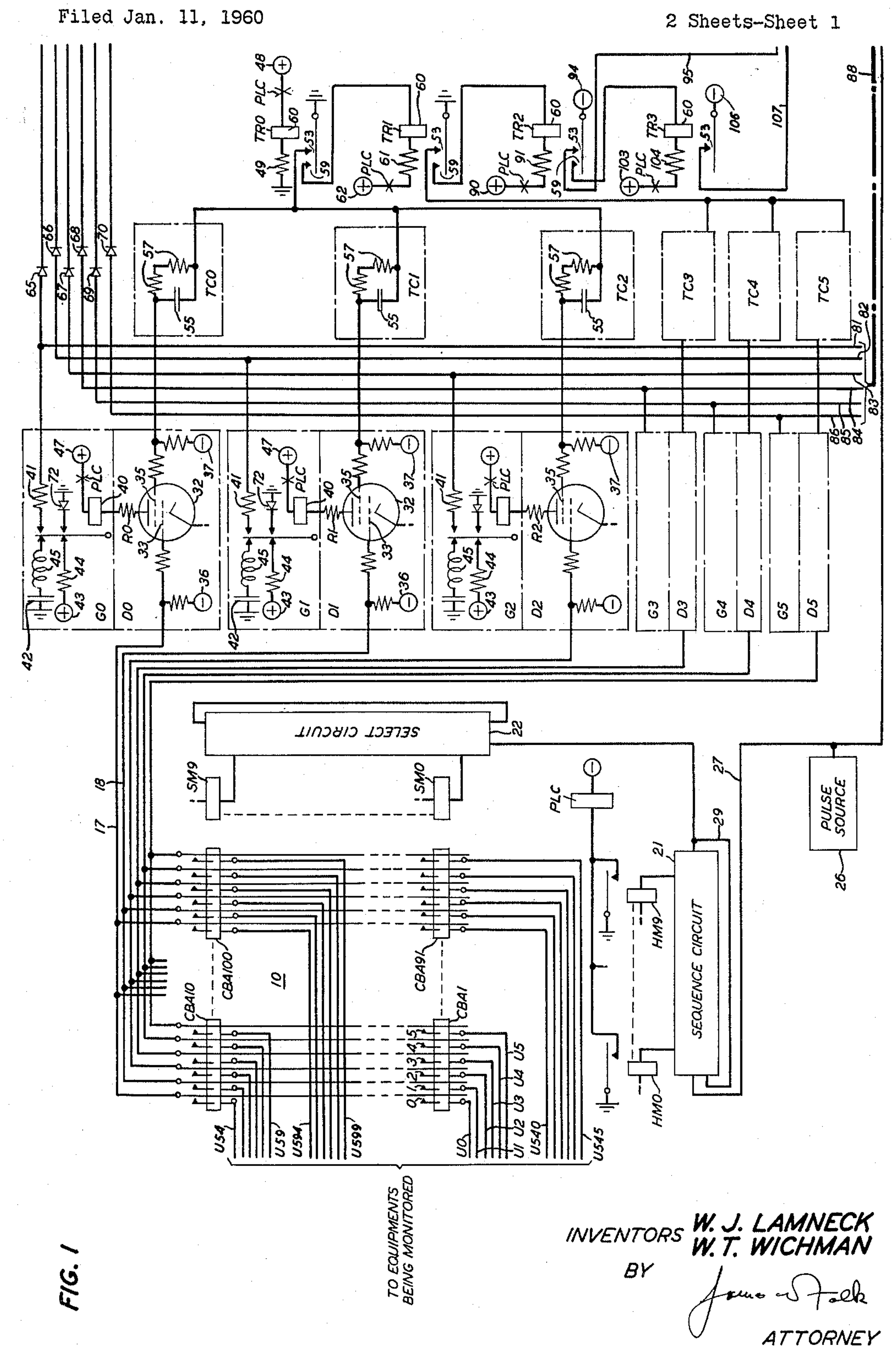

This invention relates to traffic measuring apparatus and more particularly to traffic monitoring circuits to be employed in conjunction with traffic measurement apparatus for providing traffic measurements or statistical data directly in basic units of occupancy or traffic usage.

The present demand for telephone service has necessitated that management secure the most efficient use of existing plant facilities to maintain a satisfactory and balanced grade of service to all customers. In addition, management must formulate plant investment policies in anticipation of traffic trends to perpetuate an acceptable grade of service. Accordingly, management is obliged to exercise a close operational control over existing plant facilities and to ascertain future traffic trends to be accommodated in order to continuously provide such grade of service consistent with economy of operation. Such obligation can only be satisfied by conducting repeated traffic studies to determine the adequacy or inadequacy of plant facilities with respect to the amount of traffic presently supported thereby. Also, through traffic studies, management is able to ascertain long and short-term growth or decay trends in the amount of traffic to be supported whereby necessary plant facilities can be provided in anticipation thereof. Accordingly, management is regularly in need of adequate and accurate traffic measurements for conducting these traffic studies upon which it is able to predicate either a present rearrangement of existing plant facilities in order to balance traffic loads therein or policies with respect to a future expansion or contraction thereof.

The advent of automatic switching telephone systems has resulted in the need of traffic studies conducted in terms of occupancy or traffic usage. Traffic studies which are conducted in terms of occupancy or traffic usage provide management with a more complete, accurate, and meaningful survey of traffic conditions. Traffic studies which have been heretofore conducted with respect to mechanical switching telephone systems have been primarily interested in statistical data in terms of calls or attempts, i.e., in terms of calls carried, calls overflowing, calls finding all paths busy, etc. Such statistical data is necessarily given in terms of peg counts, i.e., the number of individual seizures or occurrences of a predetermined condition; certain adjustment factors are necessary to permit the conversion of peg count data to basic units of measurement in terms of occupancy or traffic usage. Such conversions are provided by multiplying the number of individual peg counts pertaining to an individual unit of equipment by a postulated average duration of the occupancy or usage thereof. Occupancy or traffic usage is normally measured in terms of "100 call seconds" or "CCS" units. A "CCS" unit is defined as the existence of a predetermined condition, i.e., occupancy or traffic usage, for a time interval of 100 seconds.

Generally, the ideal goal of management is to achieve an occupancy or traffic figure of 100 percent, i.e., continuous occupancy or traffic usage, as regards the units of equipment which comprise existing plant facilities. However, in practice, such goal is not achievable as the occupancy or traffic usage of the existing plant facilities does not remain constant but rather rapidly fluctuates according to the traffic conditions being supported thereby at each particular instant. A more practical goal which management can achieve is to provide a fast service with a minimum of delay in the completion of a call at a price which the subscriber can afford. Therefore, present rearrangements of and plant investment policies with respect to plant facilities are normally predicated upon terms of the delay which a subscriber encounters in completing a call or the number of times such call is attempted but not completed.

Present day traffic monitoring circuits or practices which have supplanted manual-visual practices of accumulating statistical data for conducting telephone traffic studies do not provide statistical data relevant to occupancy or traffic usage in either sufficient volume or with sufficient accuracy. Traffic monitoring practices which are suggested by the present art fall into one or two classes. For example, a common practice is to provide each unit of equipment to be included in a traffic study with an individual mechanical counter which is periodically read by human agents. A second practice employed for the accumulation of statistical data consists in periodically photographing either the particular units of equipment to be included in a traffic study or indicators individually associated therewith and employing human agents to note the conditions of the particular unit or indicators, respectively. The shortcomings in each of these classes of practices are obvious. The statistical data accumulated in each of these practices is provided in terms of peg counts and must be (1) converted into basic units of occupancy or traffic usage measurement, and (2) translated into a form processable by automatic data processing equipment. As considerable time and energy are expanded on the part of human agents which are presently employed to perform these operations, the amount of statistical data that can be accumulated and processed is limited. Further, the employment of human agents necessarily increases the cost of the individual traffic surveys and provides an inherent source of error therein.

Accordingly, traffic studies heretofore conducted in terms of occupancy or traffic usage have been based upon a minimum of statistical data which is often in great variance with respect to existing traffic conditions due to a limited sampling thereof; excessive cost and effort would be demanded for the accumulation of sufficient statistical data to provide a true representation of existing traffic conditions. Further, as traffic studies are necessarily based upon probability theory, such variance of statistical data with respect to existing traffic conditions coupled with probability approximations and those necessary adjustments to convert peg count data to basic units of occupancy or traffic usage measurement presently provides management with fallible information upon which to base decisions concerning present operational control and, also, plant investment policies. It is evident that if statistical data could be more economically accumulated so that a more accurate and comprehensive representation of existing traffic conditions could be had, management would be provided with more reliable information upon which to base these decisions.

The main object of this invention is to provide a monitoring circuit of the type which may be advantageously incorporated as an integral part of a traffic measurement apparatus for accumulating statistical data directly in basic units of occupancy or traffic usage.

An object of this invention is to provide a monitoring circuit which is operative to accumulate statistical data in greater volume than heretofore possible for providing a more accurate and comprehensive representation of existing conditions with respect to a plurality of units of equipment.

A further object of this invention is to provide a monitoring circuit which is simple and economical in construction and yet operative to simultaneously accumulate statistical data relevant to the occupancy or traffic usage of a plurality of units of equipment to be studied both on an individual basis and on a group basis.

Another object of this invention is to provide a monitoring circuit which is operative to provide statistical data in such form as to be directly encodable without the intervention of human agents for subsequent processing by automatic data processing machines.

These and other objects of our invention are achieved by the provision of a monitoring circuit which is operative to provide statistical data in the form of pulse indications each representing a period of occupancy or traffic usage peculiarly identifiable with one of a plurality of units of equipment to be studied or with selected ones thereof as arranged in predetermined groups; the statistical data is thereupon directed on a time basis to an encoder device which is operative to recognize and translate each pulse indication to a binary code notation particularly designating the individual unit of the predetermined group of units of equipment peculiarly identified therewith. This binary code notation can then be serially recorded on a storage medium for later processing by automatic data processing equipment.

More particularly, such objects of our invention are achieved in one specific illustrative embodiment thereof by connecting each of the units to be monitored to individual crosspoints of a first switching apparatus, which may, for example, comprise a crossbar switch. Detector circuits are each connected to a group of the switching apparatus crosspoints and thus each detector is capable of being connected upon successive closure of the crosspoints, to a predetermined group of units of equipment to be studied or monitored. Each detector circuit is thus operative to determine the appearance of a predetermined condition at those of the units of equipment to which it is connected by the switching apparaus.

The switching apparatus is operated sequentially to connect the individual units being monitored to the detector circuits, each unit being thus monitored in sequence in a particular group to which the detector circuit is connected. Accordingly, each detector circuit is operative to monitor, in succession and on a time basis, each of the units of equipment contained in each of the predetermined groups of units of equipment to which it is connectable. By assuming that each determination represents a period of occupancy or traffic usage, each of the detector circuits makes available on a group basis statistical data with respect to a corresponding predetermined group of units of equipment and, also, on a time or individual basis, such data with respect to the individual units of equipment included in each group.

To distinguish and identify the statistical data so provided, two groups of successively controlled generator circuits are provided, the generator circuits being responsive to the detector circuits. Each of the first group of generator circuits is controlled in turn to provide pulse indications to the encoder which are peculiarly identifiable on a time basis with individual units of equipment. Subsequently, each of the second group of generator circuits is controlled in turn to direct a pulse indication to the encoder peculiarly identifiable with one of the predetermined groups of equipments.

In accordance with another aspect of our invention, a second switching apparatus, which may also be a crossbar switch, is connected to the outputs of the first generator circuits. The second switching apparatus is operative to direct the pulse indications developed by each first generator circuit to the encoder along distinct input leads, each of the encoder input leads being peculiarly identified with an individual one of the units of equipment being monitored. Accordingly, the pulse indications which are relevant to the occupancy or traffic usage of individual ones of the units of equipment and the pulses relevant to the predetermined groups of units of equipment are directed to the encoder along different sets of control or input leads from the different groups of generator circuits. By providing that the first and second groups of generator circuits are successively controlled both on a group and an individual basis between successive operations of the switching apparatus, the pulse indications are directed to the encoder in definite time sequence and can be each translated in turn to binary code notations particularly designating individual units or predetermined groups of units of equipment. Each binary code notation appearing at the output of the encoder device can, therefore, be serially recorded on a storage medium for later processing by automatic data processing equipment.

According to one feature of our invention, the first and second switching apparatus may advantageously comprise a pair of synchronously operated switches having multiple contact crosspoints such as crossbar switches; each contact of one crossbar switch is connected individually to one of the plurality of units of equipment to be studied and the corresponding contact in the other crossbar switch is connected to an encoder input lead which is peculiarly identified with the same unit of equipment. In addition, corresponding contacts in each of the crosspoints of the first crossbar switch are multipled to one of the groups of detector circuits; similarly, the same corresponding contacts in each of the crosspoints in the second crossbar switch are multipled to the corresponding one of the first group of generator circuits. Accordingly, by providing that selected ones of the plurality of units of equipment considered as a predetermined group are connected to corresponding contacts of each crosspoint, respectively, in the first crossbar switch, such units are successively monitored through successively closed crosspoints therein by one of the group of detector circuits; the output of the generator circuit in the first group responsive to the one detector circuit is successively connected through corresponding successively closed crosspoints in the second crossbar switch to the encoder input leads which are peculiarly identified with the units of equipment being monitored. Due to the synchronous operation of the pair of crossbar switches, therefore, the monitoring circuit of our invention is operative on an individual basis to direct a pulse indication along an encoder input lead peculiarly identified with one of a plurality of units of equipment at which the appearance of a predetermined condition has been determined.

Further, due to the concentrating action of the first crossbar switch whereby selected units of equipment included in a predetermined group are successively sampled by one of the group of detector circuits during each cyclic operation thereof, the monitoring circuit of our invention is also simultaneously operative to accumulate statistical data relevant to the occupancy or traffic usage of each of the predetermined groups. Therefore, another feature of our invention relates to the provision of the second group of generator circuits which are responsive one to each of the group of detector circuits for providing a pulse indication along an encoder input lead peculiarly identified with one of the predetermined groups of units of equipment upon the appearance of a predetermined condition at any one of the units of equipment included therein. Accordingly, during each cyclic operation of the synchronously operated pair of crossbar switches, statistical data relevant to the occupancy or traffic usage of a plurality of units of equipment to be studied is simultaneously accumulated on an individual basis and a group basis with respect thereto.

In addition, a feature of our invention relates to the provision of select and sequence circuits for adapting each of the pair of crossbar switches for synchronous operation whereby corresponding crosspoints included therein are successively closed on a fixed basis. Accordingly, by assuming that a predetermined condition exists at a particular unit of equipment for the duration of the monitoring cycle, i.e., a cyclic operation of the crossbar switches, each pulse indication directed by the present monitoring circuit along a particular control lead is representative of a period of occupancy or traffic usage of that unit or that predetermined group of units of equipment peculiarly identified therewith. Consequently, the monitoring circuit according to our invention can be adapted to provide statistical data identifiable with a plurality of units of equipment on either an individual basis or a group basis in basic units of occupancy or traffic usage measurement, i.e., "CCS" units, by determining the cycling period of the crossbar switches at one hundred seconds.

As the units of equipment connected to the contacts of a closed crosspoint of the first crossbar switch are simultaneously sampled by corresponding ones of the group of detector circuits, yet another feature of our invention relates to the provision of a plurality of mechanical relay devices which are arranged in a pyramid configuration and which are operative between stepping operations of the pair of crossbar switches to successively operate the first and second group of generator circuits on both a group basis and an individual basis. A predetermined sequence of operation is afforded the plurality of mechanical relay devices by the use of current limiting resistors of various magnitudes which are serially arranged with the respective coil windings thereof. By controlling the build-up of magnetic flux in this manner, the plurality of relay devices are operated to effect the desired control. Accordingly, the pulse indications provided by the operated ones of the first and second groups of generator circuits are directed from the monitoring circuit in time sequence along particular ones of peculiarly identified control leads to the encoder device.

Still another feature of our invention relates to the provision of an encoder for translating each pulse indication directed thereto on a time basis from the monitoring circuit to a binary code notation designating either the individual unit or the predetermined group of units of equipment peculiarly identified with that input lead along which each indication appears. Each binary code notation is, thereupon, directed in turn to a recording apparatus whereby it is serially recorded on a storage medium for later processing by automatic data processing equipment. The output of the encoder device is, therefore, a series of binary code notations each designating a period of occupancy or traffic usage of either the individual unit or the predetermined group of selected units of equipment and presented in a form directly processable by automatic data processing equipment.

Additional objects and features of our invention will become apparent upon a consideration of the description hereinafter set forth in conjunction with FIGS. 1 and 2 which, together, illustrate a traffic measurement apparatus in which has been incorporated a traffic monitoring circuit in accordance with our invention.

Before describing the particular elements of the specific illustrative embodiment of our invention disclosed herein, it may be advantageous to list the major components of this embodiment of our invention. First, as seen in FIG. 1, there is a switching or concentrating apparatus comprising a crossbar switch 10 for successively connecting on a fixed basis the equipments being monitored, not shown, to the traffic monitoring circuit. Second, a group of detector circuits D0 through D5 are connected to the crosspoints of the crossbar switch 10 for determining the appearance of predetermined conditions at the particular groups of equipments connected to a closed crosspoint in the crossbar switch 10. Third, a first group of generator circuits G0 through G5 are connected to the outputs of the detector circuit and, fourth, seen in FIG. 2, a second group of generator circuits G10 through G15 are connected to the outputs of the first generator circuits and thereby to the outputs of the detector circuits. Next, a gating arrangement including relays TR0 through TR3 and relays included in each of the generator circuits provide, in accordance with a particular aspect of our invention, for the sequential operation of the generator circuits. A second switching or expansion network comprises the crossbar switch 11, seen in FIG. 2, for selectively directing the output of each of the generator circuits G0 through G5 along particular input leads L0 through L599 to an encoder 12. The encoder 12 itself may advantageously be of the type more fully disclosed in Fredericks-Wichman patent application Serial No. 1603, filed on even date herewith. The output of the encoder 12 is applied through a buffer storage unit 13 to a serial reader and recorder 14 for serially recording the binary code notations from the encoder 12 onto a storage medium, such as magnetic tape, for subsequent data processing; the buffer storage 13 and the serial reader and recorder 14 may advantageously comprise the equipment disclosed in D. H. Barnes application Serial No. 1602, filed on even date herewith, now Patent 3,099,819, issued July 30, 1963.

In considering the description of our invention, a unit of equipment as herein employed refers to either a single unit of switching apparatus or an equipment including a number of such apparatus, at which apparatus or equipment appears a monitorable condition. For example, a unit of equipment may include a single trunk circuit, an overflow indicator, an all-circuits-idle indicator, etc. Further, it will become evident that the number of units of equipment to be monitored may be varied and, also, additional detector circuits and/or groups of generator circuits may be added in numerous combinations without departing from the spirit and scope of our invention.

Figure 2:
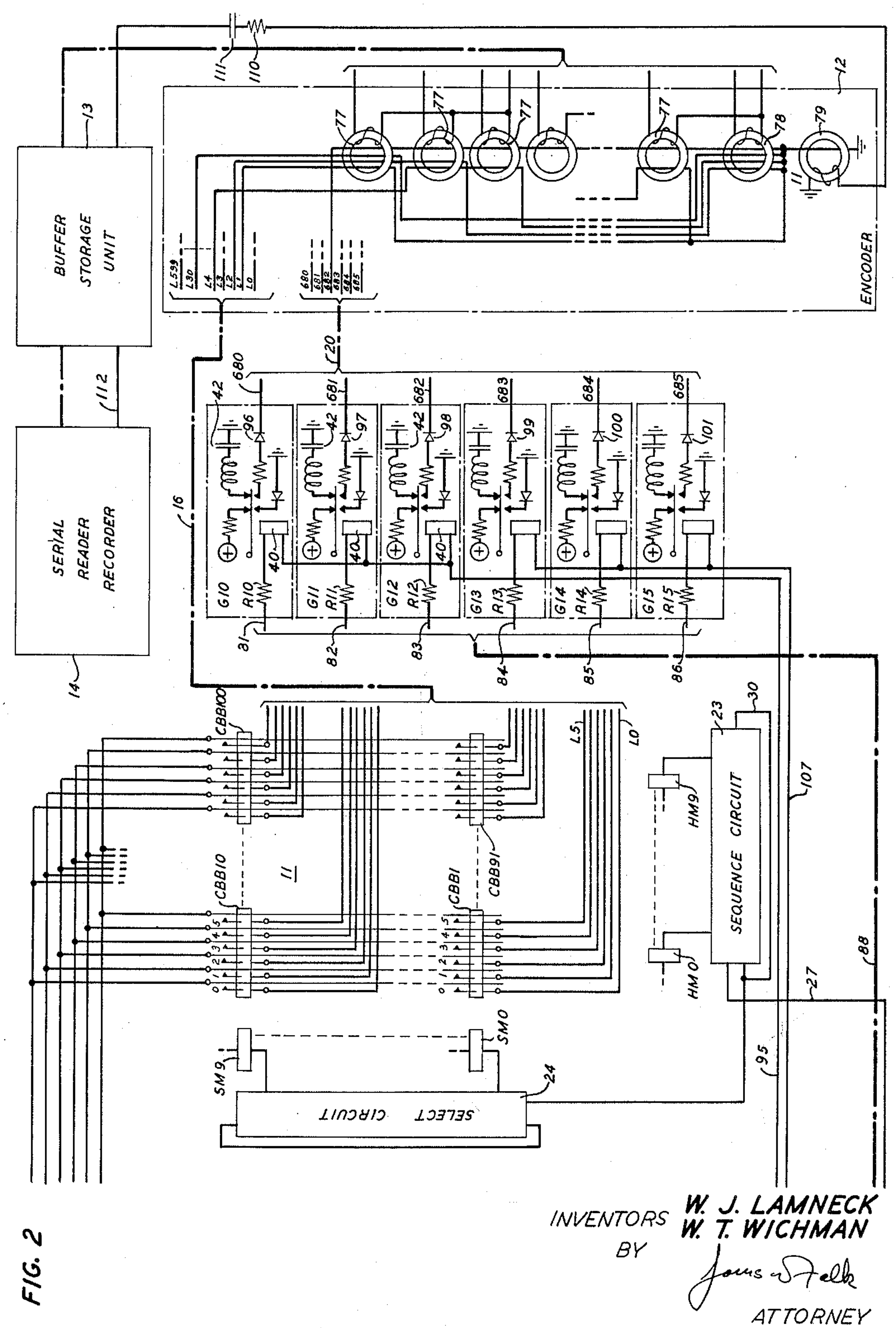

Referring now to FIGS. 1 and 2, the pair of crossbar switches 10 and 11 are synchronously operated to provide a concurrent concentration and expansion function, respectively, for deriving statistical data relevant to the traffic usage of six hundred units of equipment on both a predetermined group basis and an individual basis. Each of the crossbar switches 10 and 11 includes ten vertical columns and ten horizontal rows to effectively provide one hundred crosspoints CBA1 through CBA100 and CBB1 through CBB100, respectively, each crosspoint including six contacts 0 through 5; a total of six hundred contacts are provided in each of the crossbar switches 10 and 11. To one side of each of the six hundred contacts of the crossbar switch 10 is connected a particular one of the six hundred units of equipment, not shown, to be monitored. Similarly, a plurality of control or encoder input leads L0 through L599, included in cable 16 are connected one to each of the six hundred contacts in the crossbar switch 11, each control lead being peculiarly identified with the particular unit of equipment which is connected to the corresponding contact in the crossbar switch 10.

A group of detector circuits D0 through D5, shown interpositioned between the crossbar switches 10 and 11, are provided to determine the appearance of a predetermined condition at the particular units of equipment to which each is connected. Each of the detector circuits D0 through D5 is multipled to a corresponding contact of each of the crosspoints CBA1 through CBA100. For example, the detector circuit D0 is multipled to the contacts 0 in each of the crosspoints CBA1 through CBA100 by the lead 17; the detector circuit D1 is multipled to the contacts 1 in each of the crosspoints CBA1 through CBA100 by the lead 18, etc. It is evident, therefore, the crossbar switch 10 operates to simultaneously connect the detector circuits D0 through D5 to groups of units of equipment as particularly connected to the contacts 0 through 5, respectively, of the crosspoints CBA1 through CBA100 in turn. In other words, upon successive closures of the crosspoints CBA1 through CBA100, each of the detector circuits D0 through D5 is electrically connected in turn to individual ones of the predetermined groups of units of equipment which are connected to contacts 0 through 5, respectively, included therein.

The groups of generator circuits G0 through G5 and G10 through G15 are responsive to the group of detector circuits D0 through D5, respectively, in a manner to be more fully described. However, each of the generator circuits G0 through G5 and G10 through G15 serves to provide a pulse indication denoting each determination by the detector circuits D0 through D5, respectively, of the appearance of a predetermined condition at that one of the units of equipment to which the latter is connected through a contact of a closed crosspoint in the crossbar switch 10. It is therefore apparent that the six hundred units of equipment which are connected one to each of the contacts contained in the crossbar switch 10 may be effectively monitored on an individual basis and, also, on a group basis simultaneously. By selectively connecting the particular units of equipment for which statistical data is desired on a predetermined group basis to corresponding contacts in each or all of the crosspoints CBA1 through CBA100, each determination by one of the detector circuits D0 through D5 is identifiable as relevant to the traffic usage of such units considered as a predetermined group; as each unit of equipment is monitored successively or on a time basis by the detector circuit, such determinations are also distinguishable in time as relevant to the traffic usage of the individual units therein contained. To provide statistical data on a group basis, the generator circuits G10 through G15 are operative upon each determination by the detector circuits D0 through D5, respectively, to provide a pulse indication along the leads 680 through 685, respectively, in cable 20 to the encoder 12. Accordingly, statistical data is recognizable by the encoder 12 on a group basis as relating to each of the predetermined groups of equipment according to the particular one of the leads 680 through 685 along which it is directed. Moreover, each determination of the detector circuits D0 through D5, is distinguishable on a time basis as relating to an individual unit of equipment. Crossbar switch 11 operates to selectively direct pulse indications from each of the generator circuits G0 through G5 through the contacts in a closed crosspoint therein along selected ones of the leads L0 through L599 to the encoder 12; the leads L0 through L599 are peculiarly identifiable with those units of equipment connected to corresponding contacts in the closed crosspoint of the crossbar switch 10. Accordingly, statistical data is recognizable by the encoder 12 on an individual basis as relating to a particular unit of equipment according to the particular one of the control leads L0 through L599 along which it is directed.

To effect a proper measurement of traffic usage, it is necessary that both the number of individual seizures of a unit of equipment and, also, the duration of each individual seizure thereof be simultaneously measured. However, an approximation of the actual traffic usage of a unit of equipment is had by monitoring the appearances of a predetermined condition thereat on a fixed or time basis which is determined by the number of individual units of equipment to be monitored and the degree of approximation which is acceptable. It is evident that the greater the monitoring rate with respect to a unit of equipment, the more closely does the statistical data approach the actual traffic usage figure with respect thereto. However, acceptable approximations in traffic usage measurements are had by determining the monitoring rate of each unit of equipment at one hundred seconds and, also, assuming that a predetermined condition existing at the instant of monitoring continues to exist for the duration of the monitoring cycle.

Therefore, to provide statistical data directly in basic units of traffic measurement or "CCS" units, the crossbar switches 10 and 11 are adapted to complete a cyclic operation by successively closing each of the crosspoints CBA1 through CBA100 and CBB1 through CBB100, respectively, each one hundred seconds. For example, the crossbar switch 10 is controlled by the sequence circuit 21 and the select circuit 22 to successively close each of the crosspoints CBA1 through CBA100 at the predetermined rate. The sequence circuit 21 and the select circuit 22 are cyclically operated stepping circuits which are adapted to successively operate the hold magnets HM0 through HM9 and the select magnets SM0 through SM9, respectively, of the crossbar switch 10. Similarly, the crossbar switch 11 is controlled by the sequence circuit 23 and a select circuit 24, which may be identical to the sequence circuit 21 and the select circuit 22, respectively, to successively close each of the crosspoints CBB1 through CBB100. The sequence circuits 21 and 23 and the select circuits 22 and 24 may advantageously comprise a plurality of relay devices as shown in FIG. 11–25 on page 270 of "The Design of Switching Circuits" by Keister, Ritchie and Washburn, published by the D. Van Nostrand Company, Inc. To provide the desired synchronous operation of the crossbar switches 10 and 11, the sequence circuits 21 and 23 are simultaneously stepped by each of the advance pulses which are directed from the pulse source 26 along the lead 27 at the rate of one pulse per second.

Upon each completed cyclic operation, whereby the hold magnets HM0 through HM9 are operated in turn, the sequence circuits 21 and 23 direct a recycle pulse along the leads 29 and 30, respectively, to step the select circuits 22 and 24 to a next position whereby the next successive one of the select magnets SM0 through SM9 of the crossbar switches 10 and 11, respectively, is operated. As the select circuits 22 and 24 are operative to step a single position for each cyclic operation of the sequence circuits 21 and 23, respectively, it is evident that the corresponding crosspoints in the crossbar switches 10 and 11, respectively, are successively closed on a horizontal row basis. Each closure of a crosspoint in the crossbar switch 10, therefore, operates to connect the detector circuits D0 through D5 to the particular group of units of equipment connected to the contactors 0 through 5, respectively, to monitor the appearance of the predetermined condition thereat.

Each of the detector circuits D0 through D5 includes thyratron 32 which may advantageously be a 2D21-type thyratron or dual-grid controlled arc type rectifier device well known in the art. Thyratron 32 is employed as the active element for determining the appearance of a predetermined condition at a unit of equipment to which the detector circuit is connected through the crossbar switch 10. The thyratron 32 is normally maintained in a nonconducting or off state by bias voltages normally provided to the grid electrodes 33 and 35 by the sources 36 and 37, respectively, each grid electrode being independently operative to inhibit the establishment of conduction therethrough. The grid electrode 33 of the thyratron 32 of detector D0 is multipled by the lead 17 to the contacts 0 in each of the crosspoints CBA1 through CBA100 of the crossbar switch 10; the grid electrode 35 is connected to a control circuit TC0, hereinafter described. The grid electrode 33 is, therefore, connectable through the crossbar switch 10 to determine the appearance of the predetermined condition in turn at each of the units of equipment connected to the contacts 0 of each of the crosspoints CBA1 through CBA100. A predetermined condition at each of the units of equipment is assumed to appear as a ground potential along the associated lead. Therefore, upon the determination of a predetermined condition, there is a resultant increase in the bias voltage at the grid electrode 33 beyond the critical bias voltage whereat the grid electrode ceases to inhibit conduction through the thyratron 32; the thyratron 32, however, remains inhibited or in a non-conduction state by the independent control of the grid electrode 35 which is normally biased below its critical voltage by the source 37. Accordingly, at this time the gaseous device 32 is in a conditioned as distinguished from an enabled or conduction state. As each closed crosspoint in the crossbar switch 10 operates to simultaneously connect six units of equipment, one to each of the detector circuits D0 through D5, it becomes evident that all the detector circuits D0 through D5 may be simultaneously conditioned at a particular instant.

The conditioning of a thyratron 32, therefore, has no immediate effect on the respective ones of the generator circuits G0 through G5 and G10 through G15 except for being a prerequisite to the operation thereof. Each of the generator circuits G0 through G5 and G10 through G15 includes a mercury contact relay device and pulse generating circuitry. A 276B-type relay which consists of two front contacts and two back contacts provided with a single swinger arm arranged therebetween and continuously coated with mercury may be advantageously employed. The peculiar operation of a 276B-type relay is that all contacts therein are electrically contacted or bunched for a period of approximately one millisecond so that the two front contacts and the two back contacts are electrically connected during the process of transfer of the swinger arm therebetween.

The coils 40 of the relay devices of the generator circuits G0 through G5 are serially included with resistors R0 through R5 in the plate circuit of the gaseous devices 32 of the detector circuit D0 through D5, respectively. Therefore, each coil 40 is operative to attract the swinger arm associated therewith only upon a conduction having been established in the respective thyratron 32. The coils 40 of the relay devices of the generator circuits G10 through G15, on the other hand, are connected through the resistors R10 through R15, respectively, and the resistors 41, respectively, to one of the front contacts of the relay devices of the generator circuits G0 through G5, respectively. The two back contacts of the relay device in each of the generator circuits G0 through G5 and G10 through G15 are normally closed, i.e., the swinger arm is positioned thereacross, whereby a capacitor 42 is normally charged by the voltage source 43 through a resistor 44, a portion of the swinger arm and an inductor 45. Accordingly, during a non-conduction, e.g., conditioned, state of the thyratrons 32 of the detector circuits D0 through D5, no current flows through the coil 40 of the relay devices included in the generator circuits G0 through G5, respectively. A voltage source 47 is connectable to the plate circuits of the thyratrons 32 of the detector circuits D0 through D5 through one of the contacts of a PLC relay, the solenoids 40, respectively, and the resistors R0 through R5, respectively. The PLC relay is operated from a contact on each of the hold magnets HM0 through HM9 of the crossbar switch 10, the operation of each of the hold magnets completing a current path to ground therefor.

For purpose of description, assume that each of the detector circuits D0 through D5 have been connected through the contacts 0 through 5, respectively, in the closed crosspoint CBA1 to units of equipment U0 through U5, respectively, and that a predetermined condition exits at each of the units of equipment. Accordingly, each of the thyratrons 32 included in the detector circuits D0 through D5 is conditioned as an enabling potential, such as ground, is applied at the grid electrode 33 thereof; conduction therethrough is inhibited, however, due to the bias voltage applied to the grid electrode 35 from the source 37. The relay device PLC is at this time operated and the source 47 is connected to the plate circuits of the thyratrons 32.

A group of relay devices TR0 through TR3, also of a 276B-type, are provided which control the sequence of operation of those of the generator circuits G0 through G5 and G10 through G15 which are associated with a conditioned one of the thyratrons 32 in a manner now to be described. The operation of the hold magnet HM0 to close the crosspoint CBA1 results in the operation of the PLC relay. Thereupon, the PLC contact interposed between a source 48 and the coil of the relay device TR0 is closed to complete a current path therethrough and the resistor 49 to ground. The relay TR0 does not operate immediately as the current limiting property of the resistor 49 extends the operate time of the relay device TR0 sufficiently to insure a prior closure of the crosspoint CBA1. The contacts 53 of the relay devices TR0 and TR1 are multipled to the control circuits TC0 through TC2 and TC3 through TC5, respectively, which are in turn connected to the grid electrodes 35 of the thyratrons 32 of the detector circuits D0 through D5, respectively.

Each of the control circuits TC0 through TC5 is essentially a coupling network comprising a capacitor 55 in parallel with the resistors 57. Upon the delayed closure of the contact 53 of the relay TR0, a ground potential is applied to one plate of the coupling capacitors 55 of control circuits TC0 through TC2 which is reflected through each as a positive pulse. Each positive pulse appears as a voltage "spike" of sufficient magnitude to momentarily bias each of the grid electrodes 35 of the thyratrons 32 of the detector circuits D0 through D2, respectively, beyond the critical voltage whereupon conduction is established therethrough simultaneously. Due to the peculiar operation of thyratron devices, the grid electrode now loses control and conduction once established continues upon a cessation of the enabling pulses applied thereto, the magnitude of current flow therethrough being determined solely by circuit resistances. Accordingly, the magnitude of current flow through the coils 40 of the generator circuits G0 through G2 included in the plate circuits of the thyratrons 32 of the detector circuits D0 through D2, respectively, is determined primarily by the resistors R0 through R2, respectively.

The resistors R0 through R2 are each of selected values to provide a predetermined and different magnitude of current through each of the thyratrons 32 in the detector circuits D0 through D2, respectively. Therefore, as the magnitude of current through each of the solenoids 40 of the generator circuits G0 through G2 is different, the magnetic flux developed by each increases at a different rate. For example, by providing a resistor R0 of 4,020 ohms, a resistor R1 of 17.8K ohms, a resistor R2 of 31.6K ohms, and a source 47 of plus 130 volts, the relay devices of the generator circuits G0 through G2, respectively operate in succession at about 1.3 millisecond intervals. Accordingly, upon a closure of the contact 53 of the relay device TR0, the relay devices of the generator circuits G0 through G2 are operative in turn and in a definite sequence.

The closure of the contact 59 of the relay device TR0 completes a current path from ground through the coil 60 of the relay device TR1 and resistor 61 to the source 62. Accordingly, by again selecting the value of the resistor 61, a delayed operation is provided to the relay device TR1 sufficient to insure the successive operation of the relay devices of the generator circuits G0 through G2 prior to operation of the relay device of generator G3 upon closure of the front contacts 53 and 59 thereof. For example, by providing a resistor 61 of 21.5K ohms, and a source 62 of plus 130 volts, the delay operation of the relay device is about 4.5 milliseconds. The contact 53 of the relay device TR1 is connected to the control circuits TC3 through TC5 while the contact 59 provides for the closure of a current path through the coil 60 of the relay device TR2. The operation of the control circuits TC3 through TC5, the generator circuits G3 through G5, and relay device TR1 is identical in all respects to that which has been described with respect to the control circuits TC0 through TC2, the generator circuits G0 through G2, and the relay device TC1, respectively. Therefore, upon the closure of contact 53 of the relay device TR1, enabling pulses are directed through the control circuits TC3 through TC5 to each of the grid electrodes 35 of the thyratrons 32 of the detector circuits D3 through D5 and conduction is established therethrough. By providing that the resistors R3 through R5 be of values equal to those of the resistors R0 through R2, respectively, as hereinabove detailed, the relay devices in the generator circuits G3 through G5 similarly operate in succession at about 1.3 millisecond intervals subsequent to the successive operation of the relay devices in the generator circuits G0 through G2.

A front contact of each of the relay devices in the sequentially operated generator circuits G0 through G5 is connected through the resistors 41, respectively, to the anode of the semiconductor diode devices 65 through 70, respectively; the cathodes of the semiconductor devices 65 through 70 are multipled to the contacts 0 through 5, respectively, in the crosspoints CBB1 through CBB100. As the crosspoint CBB1 is now closed, the cathodes of the diode devices are now connected through the contacts 0 through 5, respectively, therein along the input leads L0 through L5, respectively, to the encoder 12. As is hereinafter described, each of the input leads L0 through L599 are selectively threaded through the transformer cores 77, 78 and 79 included therein to ground. Accordingly, a ground potential is provided at the cathodes of each of the diodes 65 through 70 during a closure of one of the crosspoints CBB1 through CBB100.

The other front contact of each of the relay devices in the generator circuits G0 through G5 is connected to the cathode of a semiconductor diode device 72, the anode of which is directly connected to ground. As the capacitors 42 are positively charged by the source 43, a successive bunching of the contacts of the relay devices of the generator circuits G0 through G5 provides a discharge path in turn to each through the associated inductor 45, the associated resistor 41, the diodes 65 through 70, respectively, the contacts 0 through 5, respectively, of the closed crosspoint CB1 and through the encoder 12 along the input leads L0 through L5, respectively, to ground. It is to be noted that the diodes 72 are reverse biased during the discharging of the capacitors 42, respectively. Due to the successive operation of the relay devices included in the generator circuits G0 through G5, therefore, each of the respective capacitors 42 are successively discharged in turn to provide pulse indications in a time sequence along the control leads L0 through L5, respectively, to the encoder 12. The pulse indications provided by each of the generator circuits G0 through G5 are oscillatory in character and illustratively may have a positive peak on the first half cycle of 3.5 amperes and a duration of 3.5 microseconds. The inductors 45 provide for a shaping of each pulse indication in a manner well known in the art; and the resistors 41 and the diodes 65 through 70 cooperate to eliminate disturbing transient effects which may be developed by the inductors 45 along the control leads L0 through L5, respectively. For example, the diodes 65 through 70 are each reverse-biased during the succeeding negative cycle to prevent reverse current flow from the encoder 12. Also, the resistors 41 provide sufficient damping of the voltage oscillations such that the next succeeding positive cycle does not exceed the threshold of the diodes 65 through 70, respectively.

As described above, the detector circuits D0 through D5 are multipled to the contacts 0 through 5 in the crosspoints CBA1–CBA100. The crossbar switch 10, therefore, provides a concentration function whereby each detector circuit is operative to successively monitor in turn selected units of equipment which are connected to the same contact in each of the crosspoints. Each pulse indication which is developed by the generator circuits G0 through G5 is, therefore, relevant to the traffic usage of a predetermined group of units of equipment, i.e., those units of equipment which are connected to the contacts 0 through 5, respectively, of the crosspoints CBA1–CBA100 and, also, of the individual units therein contained. The synchronous operations of the cross bar switches 10 and 11 and the expansion function provided by the latter permits each pulse indication to be identified on a time basis as a relevant to the traffic usage of a particular unit of equipment according to the particular one of the control leads L0 through L599 along which it is directed to the encoder 12. However, by taking advantage of the fact that each determination by one of the detector circuits D0 through D5 is identifiable with a predetermined group of units of equipment, pulse indications relevant to the traffic usage of each such group is provided by the successively operated generator circuits G10 through G15, now to be described. The generator circuits G10 through G15 are delayed in operation until each of the relay devices of the generator circuits G0 through G5 have completed an operation. As defined, a completed operation of a relay device denotes that the bunching phase of the contacts has been completed and the swinger arm now rests on the two front contacts thereof to connect the cathode of the diode 72 and the resistor 41. As the thyratrons 32 of the detector circuits D0 through D5 are in a conduction state, the swinger arms of the relay devices of the generator circuits G0 through G5, respectively, have passed through the bunching phase and are now maintained in this position.

Referring now to the generator circuits G10 through G15, a similar pulse generating arrangement has been provided thereto as has been described with respect to the generator circuits G0 through G5. The coil 40 of the relay device of the generator circuit G10 is, however, connected along the lead 81 in the cable 88 to ground through the resistor 41 and the diode 72 of the generator circuit D0. The coils 40 of the relay devices in each of the remaining generator circuits G11 through G15 are similarly connected in the generator circuits D1 through D5, respectively, along the leads 82 through 86, respectively.

Referring again to the relay device TR1 which was operated to allow for the successive operation of the generator circuits G3 through G5, as hereinabove described, the closure of the contact 59 thereof completes a current path which is traced from the source 90, a closed PLC contact, the resistor 91 to ground through a coil 60 of the relay device TR2. By providing that the magnitude of the resistor 91 is equal to that of the resistor 61, the operation of the relay device TR2 is delayed sufficiently to insure the previous successive operation of the generator circuits G3 through G5. The operation of the relay device TR2 completes the current paths from the source 94, the closed contact 53 thereof, along the lead 95 and through the resistors R10 through R12 and coils 40 of the relay devices of the generator circuits G10 through G12 which are connected along the leads 81, 82 and 83, respectively, through the serially arranged resistors 41 and diodes 72 of the generator circuits G0 through G2, respectively, to ground. The diodes 72 are each poles to present a low impedance to current from the source 94 through the coils 40 of the relay devices in the generator circuits G10 through G12, respectively. Again, by selecting the values of the resistors R10 through R12 of the generator circuits G10 through G12, it is evident that the magnitude of current through each of the coils 40 can be determined to provide a successive operation of the respective relay devices in a manner similar to that described above with respect to the successively operated relay devices of the generator circuits G0 through G2 and G3 through G5, respectively.

Accordingly, the capacitors 42 in each of the generator circuits G10 through G12 are discharged during the successive bunching phases of the respective relay devices included therewith to direct pulse indications through the diode devices 96 through 98, respectively, and along the input leads 680 through 682, respectively, to the encoder 12.

Similarly, the closure of the contact 59 of the relay device TR2 completes a current path from the positive source 103 through a closed PLC contact, the resistor 104 to the negative source 94 through the coil 60 of the relay device TR3. Again, a selection of the magnitude of the resistor 104 insures a sequential operation of the generator circuits G10 through G12 prior to the operation of the relay device TR3. The closure of the contact 53 of the relay device TR3 completes the current path from the source 106 along the lead 107 through the resistors R13 circuits G10 through G12 prior to the operation of the through R15 and coils 40 of the relay devices of the generator circuits G13 through G15 which are connected along the leads 84 through 86, respectively, through the serially arranged resistors 41 and diodes 72 of the generator circuits G3 through G5, respectively, to ground. Again, by selecting the values of the resistors R13 through R15, a successive operation is provided to the generator circuits G13 through G15 whereby pulse indications are successively directed therefrom through the diode devices 99 through 101, respectively, and along the leads 683 through 685, respectively, to the encoder 12.

From the description hereinabove set forth, the pulse indications provided by the generator circuits G10 through G15 and directed along the input leads 680 through 685, respectively, are peculiarly identified with and denote a period of traffic usage of the predetermined groups of units of equipment connected to the contacts 0 through 5, respectively, in the crosspoints CBA1 through CBA100. Similarly, each pulse indication provided by the generator circuits G0 through G5 and selectively directed along particular ones of the control leads L0 through L599 by the crossbar switch 11 are peculiarly identified with and denote a period of traffic usage of individual ones of the six hundred units of equipment connected one to each of the contacts of the crossbar switch 10. Due to the above-described operation of the monitoring circuit of our invention, these pulse indications are directed on a time basis along particular ones of the leads L0 through L599 and leads 680 through 685 to the encoder 12.

The encoder 12, as fully described in the above-identified Fredericks-Wichman patent application, is operative to identify each pulse indication directed thereto with an individual unit or a predetermined group of units of equipment according to the particular lead along which it appears. The encoder 12 is, thereupon, operative to provide an equivalent binary code notation particularly designating the individual unit or the predetermined units of equipment which is peculiarly identified with the particular unit. As illustrated, the encoder 12 comprises an arrangement of twelve transformer cores including cores 77, 78 and 79 with each of the leads L0 through L599 and 680 through 685 selectively threaded on a single-turn basis through or in by-pass of each transformer core to ground. With respect to the ten transformer cores 77, each of the leads L0 through L599 and 680 through 685 is selectively threaded therethrough in accordance with an equivalent reflected binary or Gray code notation of a decimal number which has been arbitrarily assigned to the particular unit or the predetermined group of units of equipment which is peculiarly identified therewith. For example, assume that the decimal number 682 has been arbitrarily assigned to that group of units of equipment which have been connected to the contacts 2 in the crosspoints CBA1 through CBA100 and which are successively monitored by the detector circuit D2. Accordingly, each pulse indication directed from the generator circuit G12, as described above, appears along the lead 682 which is selectively threaded through the transformer cores 77 according to the reflected binary code of the decimal number 682. To provide for parity checking, each of the leads L0 through L599 and, also, 680 through 685 are selectively threaded through the transformer core 78 so as to provide that each equivalent binary code notation including a parity bit directed from the encoder 12 contains an odd number of binary 1's. In addition, each of the input leads L0 through L599 and 680 through 685 are threaded through the remaining transformer core 79 which operates to provide an indication to the control logic circuitry of the buffer storage unit 13 that a binary code notation has been directed from the encoder 12 and stored in the first storage stage therein.

Each of the transformer cores 77, 78 and 79 is provided with an output winding. The output windings of the transformer cores 77 and 78 are connected to the input winding of a corresponding magnetic core, not shown, in the first storage stage of the buffer storage unit 13. Accordingly, during the current build-up of a pulse indication directed along a particular one of the leads L0 through L599 and 680 through 685, clockwise magnetic fluxes are produced in each of the transformer cores 77 and 78 through which the particular lead is threaded to effect the storage of a binary code notation in parallel in the first storage stage of the buffer storage unit 13. For example, the appearance of a pulse indication along the lead L30 induces a clockwise magnetic flux in each of the zero and fourth transformer cores 77 and core 78 to effect the storage of the binary word 10001000001 in the first storage stage of the buffer storage unit 13. It is evident that each equivalent binary code notation directed from the encoder 12 denotes one "CCS" unit of traffic usage of the individual unit or the predetermined groups of units of equipment being monitored with which it is peculiarly identified.

As fully disclosed in the above-identified D. H. Barnes patent, the buffer storage unit 13 comprises a plurality of tandemly arranged storage stages, each storage stage including a plurality of storage elements corresponding one to each of the transformer cores 77 and 78 of the encoder 12 and control logic circuitry for providing an asynchronous operation thereto. The operation of the buffer storage unit 13 is such that each equivalent binary code notation directed thereto and stored in the first storage stage thereof is automatically transferred through intermediate storage stages to a last vacant storage stage therein. The output winding of the transformer core 79, which is wound oppositely with respect to the output windings provided to the remaining transformer cores 77 and 78, is connected to the control logic circuitry of the buffer storage unit 13 through the resistor 110 and capacitor 111. Accordingly, during the current decrease of pulse indications directed to the encoder 12, a voltage is induced in the output winding of the transformer core 79 which serves as a triggering pulse to the logic control circuitry of the buffer storage unit 13 indicating that a binary word has been stored in the first storage stage. This arrangement of setting the cores in the first storage stage of the buffer storage unit 13 during the current increase of a pulse indication and triggering the control logic circuitry during the current decrease thereof provide an essential time delay which insures that the binary code notation has been completely stored prior to the transfer thereof along the tandemly arranged storage stages. As subsequent storage stages become vacant, the equivalent binary code notation stored in the next preceding storage stage is transferred thereto and, finally, stored in the last storage stage of the buffer storage unit 13. In effect, the buffer storage unit 13 is a "walking storage" which automatically shifts each equivalent binary code notation along successive ones of the tandemly arranged storage stages to the last storage stage in turn. Upon a binary code notation having been stored in the last one of the tandemly arranged storage stages, the logic control circuitry of the buffer storage unit 13 is operative to direct an enabling pulse along the lead 112 to the serial-reader recorder 14, the serial-reader recorder being thereupon operative to serially read and record on a final storage medium the equivalent binary code notation presently stored in the last one of the tandemly arranged storage stages. The binary storage unit 13 is interposed between the encoder 12 and the serial-reader recorder 14 to insure that the equivalent binary code notations directed from the encoder 12 are not mutilated as the rate at which they are directed exceeds the recording rate of the serial-reader recorder. As stated above, pulse indications are directable to the encoder 12 each 1.3 milliseconds. However, a serial-reader recorder device of the type herein employable normally requires about 23 milliseconds to complete a read and record operation. Accordingly, the buffer storage unit 13 temporarily stores or provides a backlog of the equivalent binary code notations directed from the encoder 12 whereby the apparent operating rate or efficiency thereof is increased. Accordingly, the statistical data in the form of equivalent binary code notations which has been accumulated by the monitoring circuit of our invention on both an individual basis and on a predetermined group basis with respect to a plurality of units of equipment to be studied is, thereby, serially recorded on a final storage medium by the serial-reader recorder 14 in a form which is directly processable by automatic data processing equipment.

It is to be understood that the above-described arrangements are illustrative of the application of the principles of our invention. Numerous other arrangements may be devised by those skilled in the art without departing from the spirit and scope of our invention.

What is claimed is:

1. Traffic monitoring equipment to provide indications of traffic usage of both individual units and groups of units comprising a first and a second switching means having multiple crosspoints, encoding means, means connecting each of the units to be monitored individually to a crosspoint in said first switching means, means connecting each of said crosspoints in said second switching means individually to said encoding means, means for simultaneously operating said first and second switching means sequentially to close said crosspoints therein, detector means connected to groups of said first switching means crosspoints, first pulse generator means connecting said detector means to groups of said second switching means crosspoints, and second pulse generator means connected directly to said encoding means and responsive to said detector means.

2. Traffic monitoring equipment in accordance with claim 1 further including means for sequentially operating said first pulse generator means before said second pulse generator means.

3. Traffic monitoring equipment in accordance with claim 2 wherein said first and second pulse generating means each includes a plurality of pulse generator devices and further including means for sequentially operating the generator devices in each of said pulse generator means.

4. Traffic monitoring equipment in accordance with claim 3 wherein said pulse generator devices each include a relay and a resistor in series with the operating coil of the relay, said resistors being of different values of resistance.

5. Traffic monitoring equipment comprising a plurality of units to be monitored, first and second crosspoint switching means, means for connecting each of the units to be monitored individually to said first switching means, encoder means, means individually connecting the crosspoints of said second switching means to said encoder means, detector means connected to groups of the crosspoints of said first switching means, and pulse generator means connected between said detector means and groups of said second switching means crosspoints.

6. A traffic monitoring circuit for a plurality of units of equipment comprising detector means for determining the appearances of a predetermined condition at each of said plurality of units, first switching means for successively connecting said detector means to each of said plurality of units of equipment, generator means for providing first and second pulse indications upon the determination of predetermined conditions by said detector means at the connected ones of said plurality of units of equipment, encoder means having a plurality of input leads, said plurality of input leads including a first plurality each identified with a respective one of said plurality of units of equipment and a second plurality individually identified with particular groups of said units, second switching means for directing said first indications along said first plurality of input leads, and means for directing said second pulse indications along said second plurality of input leads.

7. A traffic monitoring circuit as set forth in claim 6 wherein said generator means includes means for providing said first and said second pulse indications successively.

8. A traffic monitoring circuit as set forth in claim 6 further comprising means for synchronously operating said first and said second switching means.

9. A traffic monitoring circuit comprising a plurality of thyratron devices having a first and a second control electrode and a plate circuit, a plurality of relay devices each having an operating coil serially arranged in said plate circuit of one of said plurality of thyratron devices, biasing means connected to said first and said second control electrodes for normally maintaining each of said thyratron devices in a nonconduction state, means connected to said first control electrodes for conditioning particular ones of said thyratron devices in response to units of equipment being monitored, means connected to said second control electrodes of said plurality of thyratron devices for simultaneously enabling the conditioned ones of said thyratron devices, and current limiting means arranged in said plate circuits of said plurality of thyratron devices for providing a predetermined current flow through each of said operated thyratron devices whereby said relay devices contained in the plate circuits thereof operate in succession.

10. A traffic monitoring circuit as set forth in claim 9 further comprising a plurality of indication means responsive one to each of said relay devices.

11. A traffic monitoring circuit for providing statistical data relevant to a plurality of units of equipment comprising a plurality of indication providing circuits respectively identified with said plurality of units of equipment, a plurality of relay devices connected one to each of said plurality of indication providing circuits, control means for simultaneously initiating current flow through selected ones of said plurality of relay devices, and means for operating said selected ones of said plurality of relay devices in a predetermined sequence, said last-mentioned means including current limiting means serially arranged with each of said plurality of relay devices for providing a predetermined current flow therethrough.

12. In a traffic monitoring circuit as set forth in claim 11 wherein said control means includes a second relay device for completing a current flow path through each of said selected ones of said plurality of first-mentioned relay devices.

13. In a traffic monitoring circuit for providing statistical data relevant to a plurality of units of equipment, a first plurality of indication providing circuits including a first plurality of relay devices each identifiable with particular groups of the plurality of units of equipment to be monitored, first means for successively operating said first plurality of relay devices, a second plurality of indication providing circuits including a second plurality of relay devices connected one to each of said first plurality of indication providing circuits, second means for successively operating said second pluralities of relay devices, and encoder means responsive to said first and said second plurality of indication providing circuits.

14. In a traffic monitoring circuit as set forth in claim 13, means for providing sequential operation of said first and said second means.

15. A traffic monitoring circuit for a plurality of units of equipment comprising detector means for determining the appearance of a predetermined condition at each of said units of equipment, generator means for providing a first and a second pulse indication upon each determination by said detector means, switching means for successively connecting said detector means to selected ones of said plurality of units of equipment to be considered as a predetermined group, means for enabling said generator means to determine said first indications as relating to said selected ones of said plurality of units of equipment and said second pulse indications as relating to said predetermined groups, and encoding means for translating said first and said second pulse indications to binary code notations particularly designating each of said selected ones of said plurality of units of equipment and said predetermined groups.

16. A traffice monitoring circuit as set forth in claim 15 further comprising means for successively directing said first and said second pulse indications to said encoder unit.

17. A traffic monitoring circuit for providing statistical data relevant to a plurality of units of equipment comprising a plurality of detector circuits, each of said detector circuits being conditioned by a predetermined condition at one of said plurality of units of equipment, switching means for successively connecting each of said plurality of detector circuits to selected ones of said plurality of units of equipment considered as a corresponding predetermined group, a plurality of first and second generator circuits connected one to each of said plurality of detector circuits, means for operating conditioned ones of detector circuits in a predetermined sequence, means for providing a sequential operation to said first and second generator circuits upon the operation of said connected detector circuit, and encoder means responsive to each of said first and second generator circuits for providing equivalent binary code notations particularly designating said units of equipment at which predetermined conditions are detected by said plurality of detector circuits both on an individual basis and on a predetermined group basis.

18. A traffic monitoring circuit for providing statistical data relevant to a plurality of units of equipment comprising a plurality of detector circuits, means for connecting each of said detector circuits one to each of said plurality of units of equipment, said detector circuits being conditioned by a predetermined condition at said connected unit of equipment, first control means connected to a first group of said plurality of detector circuits, second control means connected to a second group of said plurality of detector circuits, said first and said second control means being operative on a group basis to enable conditioned ones of said detector circuits contained in said first and said second groups respectively, a plurality of relay devices connected one to each of said plurality of detector circuits, means for operating said relay devices in a predetermined sequence, coil operating means including current limiting means for providing a predetermined current flow through each of said enabled ones of said detector circuits, a plurality of indication providing circuits responsive one to each of said relay devices, and encoder means connected to said plurality of indication providing circuits and responsive thereto.

19. A traffic monitoring circuit as set forth in claim 18 wherein said first and said second control means include first and second relay devices respectively, and further comprising means for providing a sequential operation to said first and said second relay devices whereby said first and said second control means are successively operated.

20. A traffic monitoring circuit as set forth in claim 18 wherein said current limiting means include a plurality of impedance devices, each of said plurality of impedance devices being connected to one of said plurality of detector circuits and serially arranged with said relay device connected thereto and each of said plurality of impedance devices connected to said detector circuits in each of said first and said second groups being of different impedance magnitudes.

21. A traffic monitoring circuit for providing statistical data relevant to a plurality of units of equipment comprising a plurality of detector means, first switching means for successively connecting each of said detector means to selected ones of said plurality of units of equipment considered as predetermined groups, a first plurality of indication providing circuits responsive one to each of said detector means and including a relay device, a second plurality of indication providing circuits responsive one to each of said relay devices included in said first plurality of indication providing circuits, an encoder having a first plurality of input leads connected one to each of said second plurality of indication providing circuits and each being identifiable with a respectve one of said predetermined groups, and a second plurality of input leads, and second switching means synchronously operated with said first switching means for successively connecting each of said first plurality of indication providing circuits to selected ones of said second plurality of input leads, whereby each of said second plurality of input leads is individually identified with a particular one of said units of equipment.

22. A traffic monitoring circuit as set forth in claim 21 wherein said first and said second switching means each includes a crossbar switch having multicontact crosspoints and means for closing successive ones of said crosspoints on a fixed basis.

23. A traffic monitoring circuit for providing statistical data relevant to a plurality of units of equipment comprising a plurality of detector circuit means for providing a pulse indication upon the determination of a predetermined condition, concentrating network means for successively connecting said plurality of detector circuit means to particular groups of the units of equipment at which said predetermined conditions occur, an encoder having a first group and a second group of input leads, each of said first group of input leads being individually identifiable with one of said plurality of units of equipment, expansion network means synchronously operated with said concentrating network means for connecting each of said plurality of detector circuit means to that one of said first group of input leads individually identified with that one of said plurality of units of equipment connected thereto through said concentrating network means, a plurality of indication providing means each responsive to one of said plurality of detector circuit means and each connected to a particular one of said second group of input leads, first means for successively operating said plurality of detector circuit means, second means for successively operating said plurality of generating means, and means for providing a successive operation to said first and second means.

24. A traffic monitoring circuit for providing statistical data relevant to a plurality of units of equipment comprising synchronously operated first and second crossbar switches having multicontact crosspoints, said contacts of said first crossbar switch corresponding one to each of said contacts of said second crossbar switch, means successively closing said crosspoints in said first and said second crossbar switches, means for connecting said plurality of units of equipment one to each of said contacts of said first crossbar switch, an encoder having a first and a second group of input leads, means for connecting said first group of input leads one to each of said contacts of said second crossbar switch so as to be peculiarly identified with said unit of equipment connected to said corresponding contact of said first crossbar switch, a plurality of detector-generator circuit means multipled to predetermined ones of said corresponding contacts in each of said first and second crossbar switches, a plurality of generator means responsive one to each of said plurality of detector-generator circuit means and connected one to each of said second group of input leads so as to be peculiarly identified with said units of equipment connected to said multipled corresponding contacts, first control means for providing a predetermined sequence of operation to said detector-generator circuit means, second control means for providing a predetermined sequence of operation to said plurality of generator circuits, and means for sequentially operating said first and said second control means whereby said encoder is responsive to said plurality of detector-generator circuit means and said generator means on a one-at-a-time basis.

25. In a traffic monitoring circuit for providing statistical data relevant to a plurality of units of equipment, means for detecting the condition of successive groups of said plurality of units of equipment, a first plurality of relay devices each individually identifiable with correspondingly positioned units of equipment in each of said successive groups, said correspondingly positioned units of equipment defining predetermined groups, a first plurality of indication providing circuits responsive one to each of said first plurality of relay devices, a second plurality of relay devices connected one to each of said first plurality of relay devices so that each of said second plurality of relay devices corresponds to one of said predetermined groups, means for providing a sequential operation to connected ones of said first and said second plurality of relay devices, a second plurality of indication providing circuits responsive one to each of said second plurality of relay devices, and encoder means responsive to said first and said second plurality of indication providing circuits, said encoder means providing coded outputs in response to the operation of each of said first plurality of indication providing circuits on an individual basis as relating to particular ones of said plurality of units of equipment and in response to the operation of each of said second plurality of indication providing circuits as relating to a corresponding predetermined group.

References Cited in the file of this patent

UNITED STATES PATENTS

| | | |
|---|---|---|
| 2,378,541 | Dimond | June 19, 1945 |
| 2,882,340 | Murray | Apr. 14, 1959 |
| 2,909,608 | Callaway et al. | Oct. 20, 1959 |
| 2,976,365 | Young | Mar. 21, 1961 |
| 3,018,334 | Middaugh | Jan. 23, 1962 |